United States Patent
Odhner et al.

(10) Patent No.: US 10,259,122 B2
(45) Date of Patent: Apr. 16, 2019

(54) COMPLIANT ADAPTIVE ROBOT GRASPER

(71) Applicant: President and Fellows of Harvard College, Cambridge, MA (US)

(72) Inventors: Lael Ulam Odhner, Medford, MA (US); Leif Patrick Jentoft, Cambridge, MA (US); Yaroslav Tenzer, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 15/553,358

(22) PCT Filed: Mar. 4, 2016

(86) PCT No.: PCT/US2016/020823
§ 371 (c)(1),
(2) Date: Aug. 24, 2017

(87) PCT Pub. No.: WO2016/141266
PCT Pub. Date: Sep. 9, 2016

(65) Prior Publication Data
US 2018/0117773 A1    May 3, 2018

Related U.S. Application Data

(60) Provisional application No. 62/128,775, filed on Mar. 5, 2015.

(51) Int. Cl.
*B25J 13/08*        (2006.01)
*B25J 15/02*        (2006.01)
(Continued)

(52) U.S. Cl.
CPC .......... *B25J 15/022* (2013.01); *B25J 13/084* (2013.01); *B25J 15/0009* (2013.01); *B25J 15/024* (2013.01); *B25J 15/12* (2013.01)

(58) Field of Classification Search
CPC .... B25J 15/0009; B25J 15/022; B25J 13/084; B25J 15/12; B25J 15/024
See application file for complete search history.

(56) References Cited

U.S. PATENT DOCUMENTS

| 5,762,390 A | 6/1998 | Gosselin et al. |
| 8,231,158 B2 | 7/2012 | Dollar et al. |
| (Continued) | | |

FOREIGN PATENT DOCUMENTS

| CN | 102528804 A | * | 4/2012 | |
| DE | 19547534 A1 | * | 6/1997 | ............ B25J 13/082 |
| (Continued) | | | | |

*Primary Examiner* — Stephen A Vu
(74) *Attorney, Agent, or Firm* — Modern Times Legal; Robert J. Sayre

(57) ABSTRACT

A compliant adaptive robot grasper comprises a multi-bar finger linkage, including a fingertip link, at least one base link, and front and rear links joining the base link via a first set of joints with the fingertip links via a second set of joints. The base link includes a mounting structure, allowing it to be mounted on a mounting block for rotary actuation. Linear connections between the joints form a shape substantially in the form of a parallelogram allowing the linear connections across the front and rear links to remain substantially parallel to one another as the front and rear links pivot about the base link without substantially changing the orientation of the fingertip link until and unless the multi-bar finger linkage contacts an external object.

24 Claims, 10 Drawing Sheets

(51) Int. Cl.
    *B25J 15/12*    (2006.01)
    *B25J 15/00*    (2006.01)

(56)    References Cited

U.S. PATENT DOCUMENTS

| | | | |
|---|---|---|---|
| 8,333,417 | B2 | 12/2012 | Bannasch et al. |
| 8,833,827 | B2 | 9/2014 | Ciocarlie et al. |
| 2014/0132018 | A1 | 5/2014 | Claffee et al. |
| 2014/0132020 | A1 | 5/2014 | Claffee et al. |
| 2014/0132021 | A1 | 5/2014 | Claffee et al. |
| 2014/0255401 | A1 | 9/2014 | Chi et al. |
| 2014/0365009 | A1 * | 12/2014 | Wettels .................. B25J 9/1612 700/258 |

FOREIGN PATENT DOCUMENTS

| | | | | |
|---|---|---|---|---|
| DE | 19903660 | A1 * | 8/2000 | ............ B25J 15/022 |
| DE | 202014005295 | U1 * | 9/2014 | ............ B25J 9/0009 |
| EP | 2161227 | A1 * | 3/2010 | ............ B25J 15/022 |
| EP | 2735406 | A1 * | 5/2014 | |
| WO | WO-2010007795 | A1 * | 1/2010 | ............ B25J 15/022 |

* cited by examiner

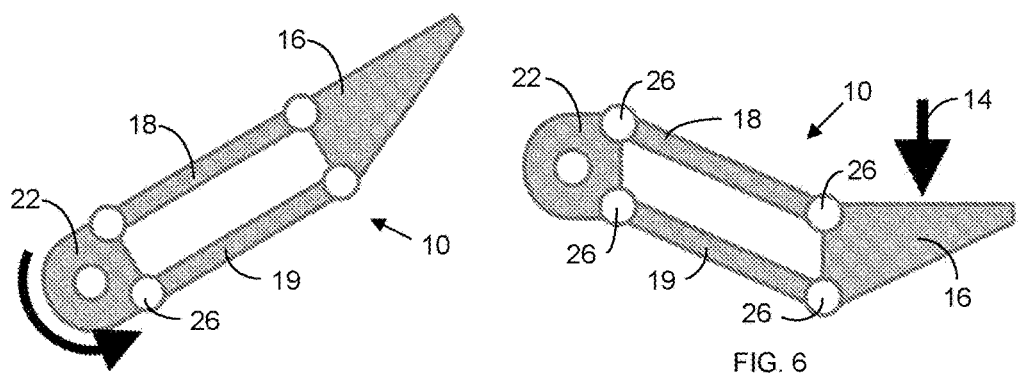
FIG. 5
FIG. 6
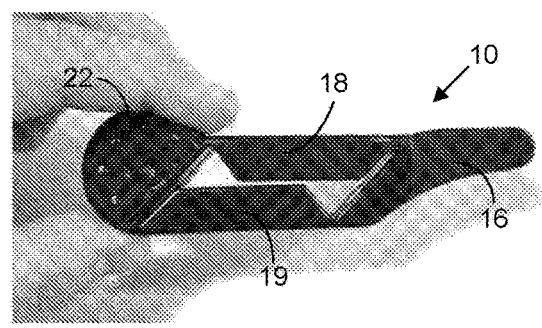
FIG. 7
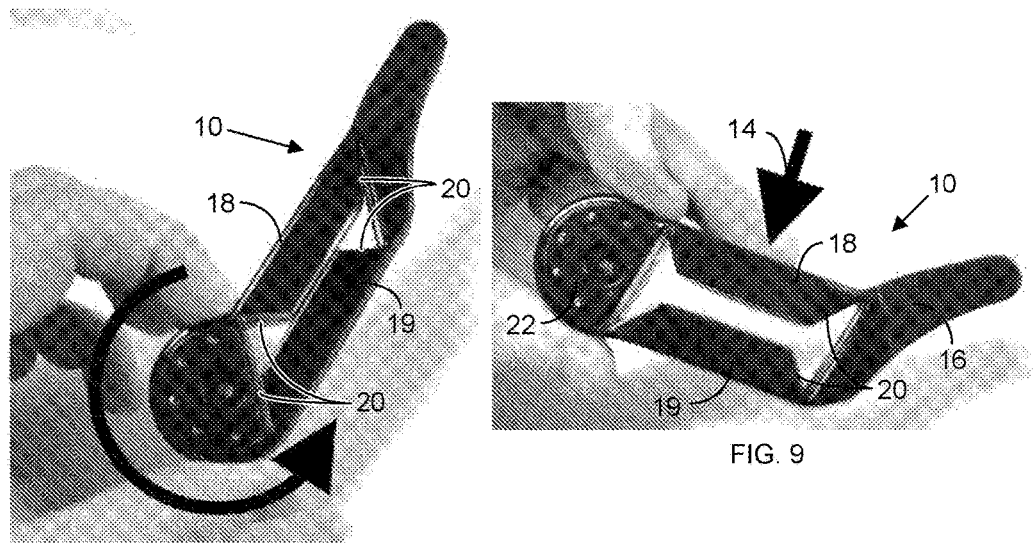
FIG. 8
FIG. 9

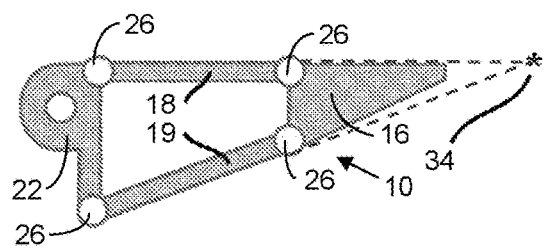
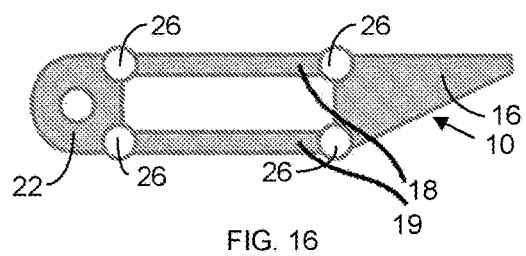
FIG. 14
FIG. 16
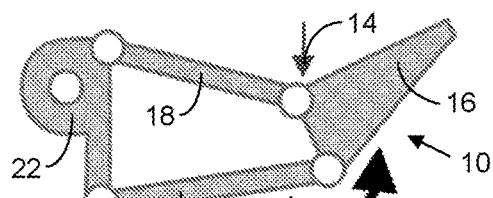
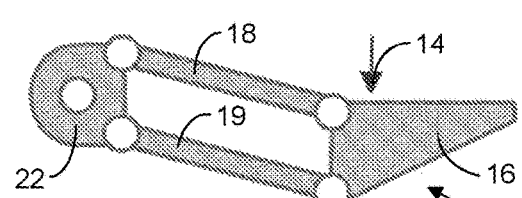
FIG. 15
FIG. 17
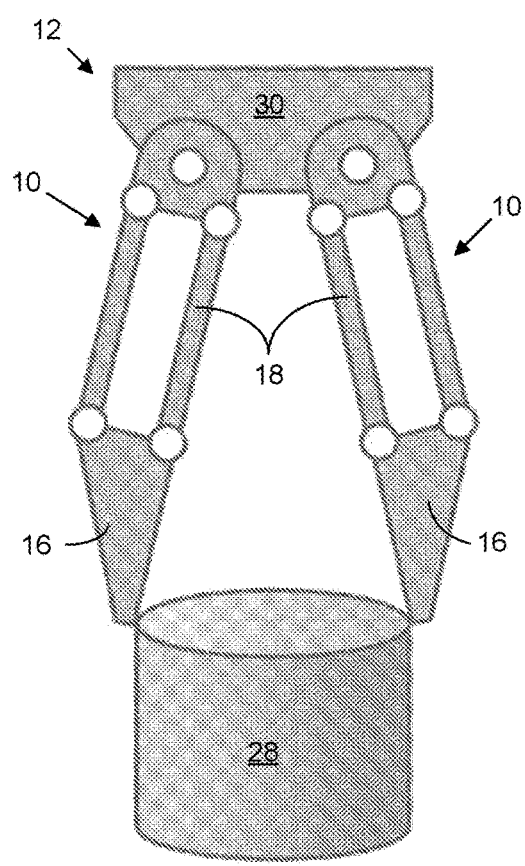
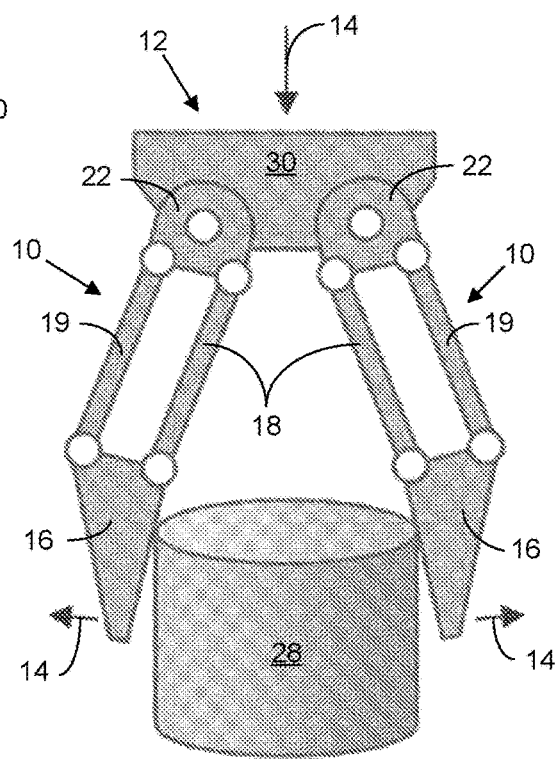
FIG. 18
FIG. 19

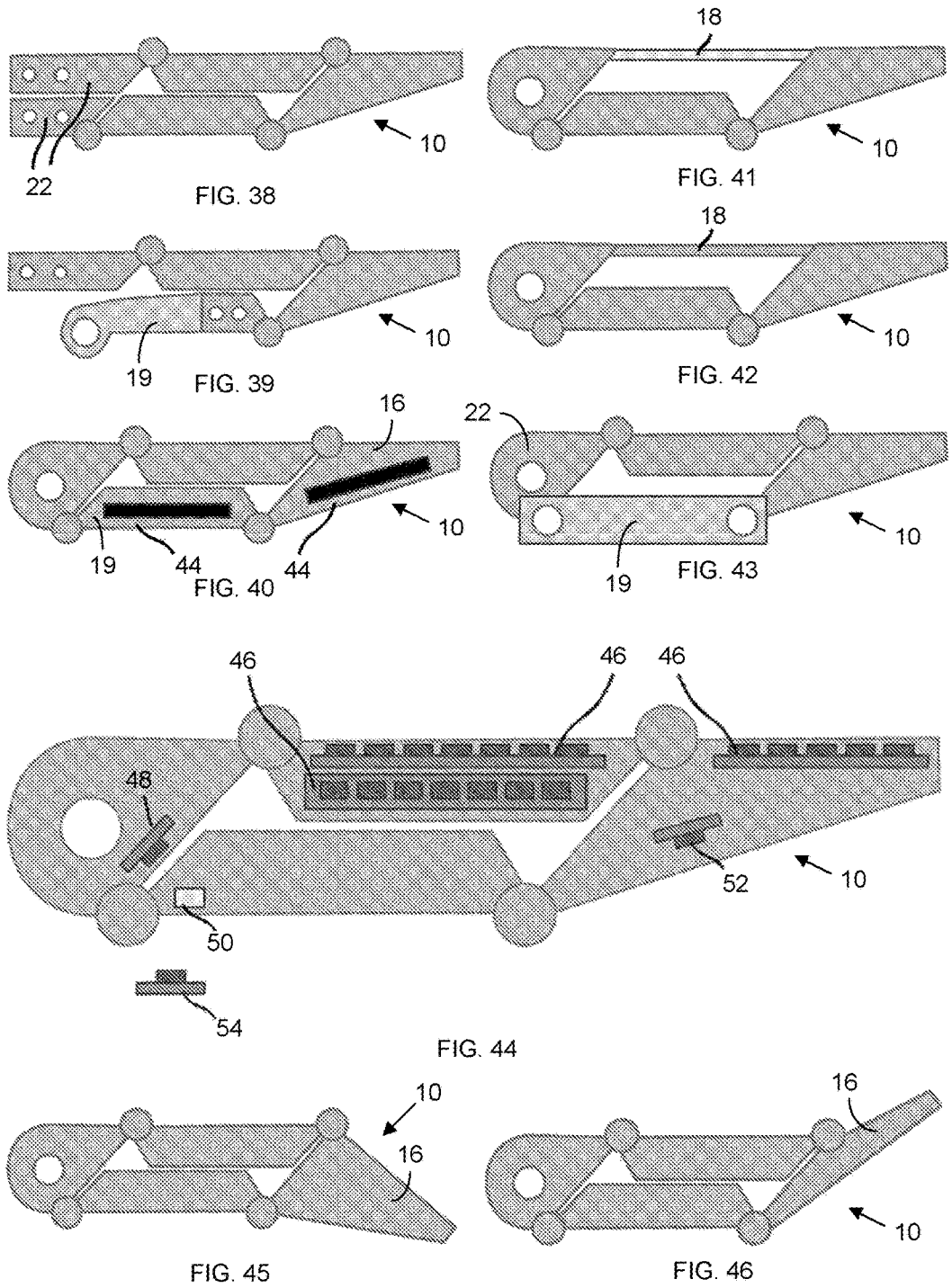

COMPLIANT ADAPTIVE ROBOT GRASPER

CROSS-REFERENCE TO RELATED APPLICATIONS

This application claims priority to and the benefit of U.S. Provisional Patent Application No. 62/128,775, filed on Mar. 5, 2015, which is hereby incorporated herein by reference in its entirety.

GOVERNMENT SUPPORT

This invention was made with government support under Grant No. IIP-1445364 awarded by the National Science Foundation. The United States Government has certain rights in the invention.

BACKGROUND

Mechanical grasping is advantageous in a number of applications, including robotics and prosthetics. In industrial and logistics robotics, graspers acquire and move objects as part of manufacturing and packaging processes, such as loading and unloading machines and putting parts into pallets and shipping containers. In typical current practice, gripper fingers are designed for each specific part that is handled, and the programming for performing the grasping and placement process is specialized for the specific task. This customization improves reliability and reduces the possibility of damage to the objects. The creation of specialized hardware and software for each task and item requires skilled labor, increasing costs and decreasing flexibility.

In unstructured environments where household and assistance robotics function, a wide variety of items may need to be reliably and safely grasped and placed. Current grippers are limited in capabilities, with two-fingered parallel-jaw grippers being the most commonly used (e.g., PR2 grippers). These devices are not able to handle a broad range of object sizes and shapes, and ensuring reliability typically requires extensive sensing and control that is expensive and difficult to achieve in unstructured settings.

More elaborate multi-fingered robot hands (e.g., the BarrettHand from Barrett Technology, LLC, of Newton, Mass.) have the mechanical flexibility to grasp a wider range of objects, but they tend to be expensive. To take advantage of the potential of these devices for adapting to diverse items and settings, sensing is used to detect the object properties, and then controllers are utilized for the many degrees of freedom that must be programmed. This approach has proved challenging.

Similarly, current under-actuated hands, which use passive mechanisms and/or compliance to adapt to object geometry, are limited in terms of the range of objects that can be accommodated. Existing under-actuated hands also tend to be expensive to manufacture and many approaches are not robust to the collisions that can occur in unstructured environments, or during programming and system debugging in industrial applications.

SUMMARY

A compliant adaptive robot grasper (the terms, "grasper" and "gripper", may be used interchangeably herein to refer to the same or similar devices) and methods for using and fabricating the grasper are described herein, where various embodiments of the apparatus and methods may include some or all of the elements, features and steps described below.

A compliant adaptive robot grasper comprises a multi-bar finger linkage, including a fingertip link; at least one base link at an opposite end of the linkage from the fingertip link, wherein the base link includes a mounting structure; and a front link and a rear link joined with the fingertip link at a first set of respective joints and joined with the base link at a second set of respective joints, wherein linear connections between the joints form a shape substantially in the form of a parallelogram, allowing the linear connections across the front and rear links to remain substantially parallel to one another as the front and rear links pivot about the base link without substantially changing the orientation of the fingertip link until and unless the finger linkage contacts an external object. Additionally, an actuator is coupled with the base link to rotate the multi-bar finger linkage about the base link.

The robotic grasper can use passive mechanics to achieve effective grasping behavior. The finger structure can be designed to function as a kinematic linkage mechanism so that the fingers adapt to the object shape and size without a need for elaborate sensing and control. Finger-tip compliance can be designed so that the fingertip links deflect along the object surface at initial contact, which allows for successful grasping despite positioning errors. As the fingers close on an object, the finger shape deforms so that the object is securely grasped despite large variation in geometry. The out-of-plane compliance of the fingers can also be controlled to allow for effective and non-damaging interactions with the object.

The four-bar parallel (or substantially parallel—e.g., wherein each link is within 1, 2, 3, 4 or 5° of being parallel to a link on the opposite side of the linkage, wherein the angle of each link is determined via a straight line intersecting the joints on both ends of the link) linkage includes both passive and active displacement structures, wherein the robot fingertip links maintain a fixed angle of orientation relative to adjacent front and rear links until at least one of the links contacts an external object. If the front link contacts the object, the fingertip link(s) can passively pivot along the object as the finger(s) is/are closed around the object. If the fingertip link(s) contact(s) the object, the fingertip links can maintain a fixed angle relative to the object (e.g., two oppositely facing fingers can contact an orthogonal object on opposite sides, and the fingertip links can remain parallel to the contacted object surface and to each other—where multiple fingers are employed—while pivoting relative to the adjacent front and rear links after the fingertip links contact the surfaces and as the fingers clamp onto the object with increasing or continuous force). In either case, the orientation of the fingertip links is decoupled from the actuation of any of the other links.

An additional advantage of embodiments of the grasper is that the fingers can be inexpensively manufactured using polymer molding techniques that are widely employed, thereby reducing costs. This manufacturing method also provides a robust construction.

Advantages of robot graspers described herein may include the ability to handle a broad range of object sizes and shapes without modification of the device hardware. Embodiments of the robot graspers can also handle diverse objects without the need for elaborate sensing and control, thereby reducing costs and increasing reliability. The robotic grasper can be inexpensive to manufacture and robust to unplanned impacts and can have a long service life before requiring maintenance or replacement. Additionally, control of the position and orientation of the fingertip links can be carried out with greater certainty and accuracy compared with other robotic gripper/grasper designs due, e.g., to the independence of the active and passive displacement of the fingers in embodiments of the grasper described herein.

BRIEF DESCRIPTION OF THE DRAWINGS

FIG. 5 illustrates how the relative positioning and orientation of the finger components do not shift as the finger 10 is actively rotated at the base link 22.

FIG. 6 illustrates how an external force 14 from contact on the fingertip link 16 of a finger 10 passively causes pivoting at the joints 26 and shifts the position and orientation of the front link 18 and rear link 19 relative to the fingertip link 16 and base link 22.

FIG. 7 illustrates the elastomeric finger 10 of FIG. 2 where an external force produces "shearing" of the front and rear links 18 and 19.

FIG. 8 illustrates the elastomeric finger 10 of FIG. 2, where an external force produces "shearing" of the front and rear links 18 and 19 in a direction opposite to that of FIG. 7; hard stops 20 integrated into the structure of the front and rear links 18 and 19 limit the degree of rotation/sheering.

FIG. 9 illustrates how a downward force 14 on the front link 18 of the finger of FIG. 2 while rotating the base link 22 counter-clockwise can cause the fingertip link 16 to pivot relative to the front and rear links 18 and 19.

FIG. 14 illustrates a finger 10, wherein the front and rear links 18 and 19 are non-parallel, showing the center of rotation 34.

FIG. 15 illustrates the finger 10 of FIG. 14, illustrating how the fingertip link 16 pivots with a passive contact force 14.

FIG. 16 illustrates a finger 10 with parallel links 18 and 19.

FIG. 17 illustrates the finger 10 of FIG. 16, showing how a passive contact force 14 results in straight-line (non-rotating) deflection of the fingertip link 16.

FIG. 18 illustrates a grasper 12, wherein the parallel linkage feature allows the fingers 10 to gently flex when the fingers 10 are thrust over an object 28.

FIG. 19 shows the grasper 12 of FIG. 18, where the fingers 10 are extended further across the object 28 as the grasper 12 is forced downward, and where the fingertip links 16 slide over and pivot via a straight-line deflection around the contours of the object 28.

FIG. 38 illustrates an alternative embodiment of a finger 10 including two base links 22, each of which is separately attached to the mounting block 30.

FIG. 39 illustrates an alternative embodiment of a finger 10, wherein the rear link 19 is formed of metal.

FIG. 40 illustrates an alternative embodiment of a finger 10, wherein stiff inserts 44 are included in the rear link 19 and the fingertip link 16.

FIG. 41 illustrates an alternative embodiment of a finger 10, wherein an in-molded belt or other tension element serves as the front link 18.

FIG. 42 illustrates an alternative embodiment of a finger 10, wherein a molded fully flexible link that can deform under compression serves as the front link 18.

FIG. 43 illustrates an embodiment of a finger 10 with an alternative embodiment of a metal rear link with pin joints embedded in the base link 22.

FIG. 44 illustrates a monolithic finger 10 with embedded (in-molded) sensors including tactile sensors 46, a magnetometer 48, a magnet 50 to be read by the magnetometer 48, and one or more additional sensors 52 selected from a micro-electro-mechanical-system (MEMS) accelerometer, a MEMS gyroscope, and a MEMS inertial measurement unit; also shown is an externally mounted magnetometer 54.

FIGS. 45 and 46 illustrate fingers 10 with alternative shapes for the fingertip links 16; specifically, FIG. 45 shows a forward-swept fingertip link 16, while FIG. 46 shows a backward-swept fingertip link 16, without changing the basic passive behavior of the design.

Figure 1:
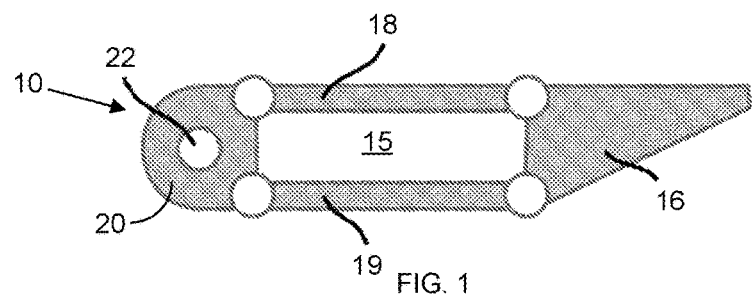
FIG. 1 is a schematic illustration of a finger 10 with a four-bar structure, including a fingertip link 16, a front link 18, a rear link 19, a base link 22, and a mounting orifice 24 defined in the base link 22.

In the accompanying drawings, like reference characters refer to the same or similar parts throughout the different views; and apostrophes are used to differentiate multiple instances of the same or similar items sharing the same reference numeral. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. In a particular example, embodiments of the apparatus described herein utilize thinned sections in the linkage to perform approximately as "joints", which may not satisfy what some might recognize as the most idealistic or purest exemplification of a joint (because these links pivot by flexing across a very short strip but not, strictly speaking, at a single point); nevertheless, these types of structures are to be recognized as representing a "joint" herein, as any resulting differences do not significantly hinder their function. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

The robotic graspers 12, described herein, can be used, e.g., for robotic picking applications. The grasper 12 can be placed on the end of a robot arm, and the fingers 10 can be positioned around an object 28 and guided by a camera and a control system that guides the grasper's approach trajectory before and after grasping. In order to do this reliably and robustly, the grasper 12 can exhibit the following traits.

First, the grasper 12 conforms or "adapts" to the shape of the object 28 to be picked without damaging the object 28 or knocking the object 28 over. This grasping can be accomplished by means of elaborate tactile or visual sensor systems, but the cost of these systems may quickly become prohibitive. A simple, inexpensive passive mechanism can be used to govern this desired adaptive behavior instead.

Second, the grasper 12 can be made to be robust with respect to inadvertent contact with obstacles in the environment (e.g., walls, totes or bins, the robot arm, an operator, etc.) so that the robot does not need to be repaired after each collision.

Third, the passive compliance of the grasper 12 that accounts for the first two traits, above, is tunable so that the amount of motion in any direction resulting from some contact force 14 is controllable. In particular, it is advantageous to adjust the out-of-plane compliance of the fingers 10 (the motion perpendicular to the surface contacting the object 28) relative to the in-plane compliance.

Fourth, the grasper 12 can be inexpensive to manufacture by a conventional fabrication process.

Fifth, the grasper 12 can pick objects 28 by thrusting the fingers 10 parallel to the grasper's direction of approach to an object, without the fingers 10 curling up or buckling. FIGS. 18 and 19 illustrate this thrusting motion.

Sixth, the grasper 12 can be capable of firmly grasping an object 28, holding it fixed relative to the wrist of the robot with either the fingertip links 16 or with contact on a plurality of the finger links, as illustrated in FIGS. 10-13.

Figure 2:
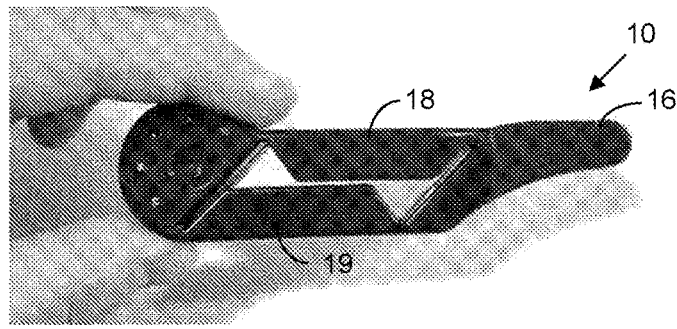
FIG. 2 illustrates a monolithic finger 10 formed of elastomer.
Figure 3:
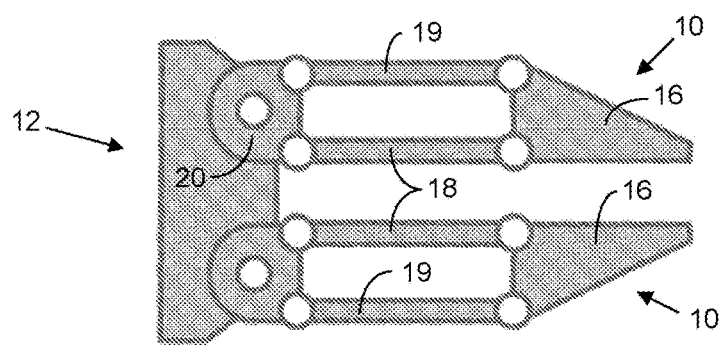
FIG. 3 is a schematic illustration of a robot grasper 12 with two opposed fingers 10.
Figure 4:
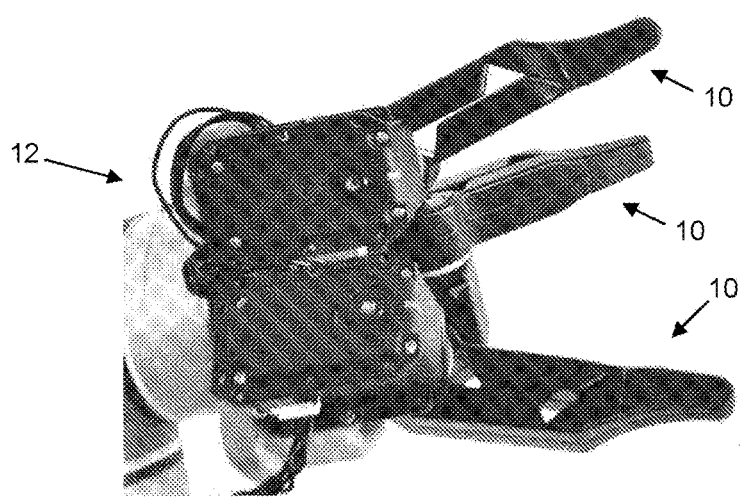
FIG. 4 illustrates a grasper 12 with three fingers 10 extended.
Figure 10:
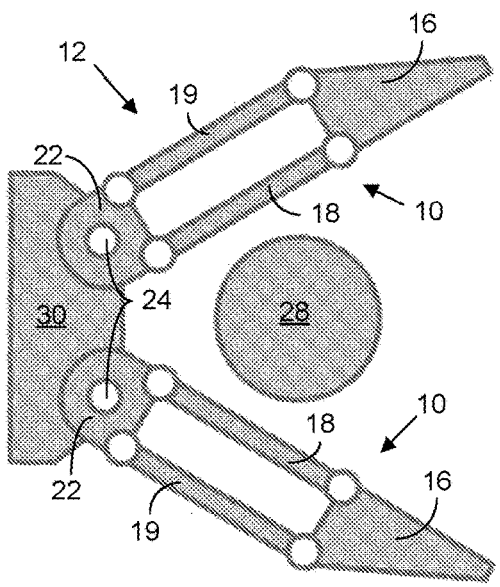
FIG. 10 illustrates a grasper 12 with fingers 10 mounted via orifices 24 to a mounting block 30 and positioned to grasp an object 28.
Figure 11:
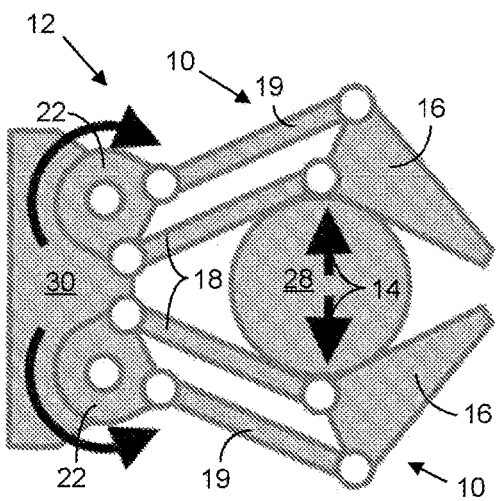
FIG. 11 illustrates the grasper 12 of FIG. 10 after the fingers 10 are rotated at their base links 22 to produce contact between the fingers 10 and object 28 that causes the fingertip links 16 to wrap around the object 28 in an enveloping grasp.
Figure 12:
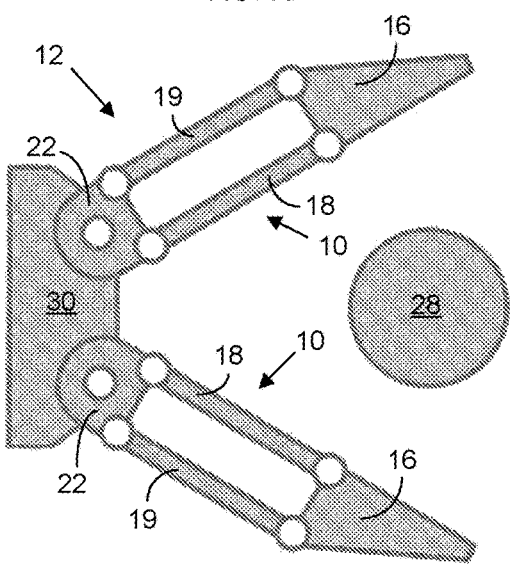
FIG. 12 illustrates a grasper 12 with fingers 10 positioned to grasp an object 28 with the object 28 positioned further out from the base link 22 than in FIG. 10.
Figure 13:
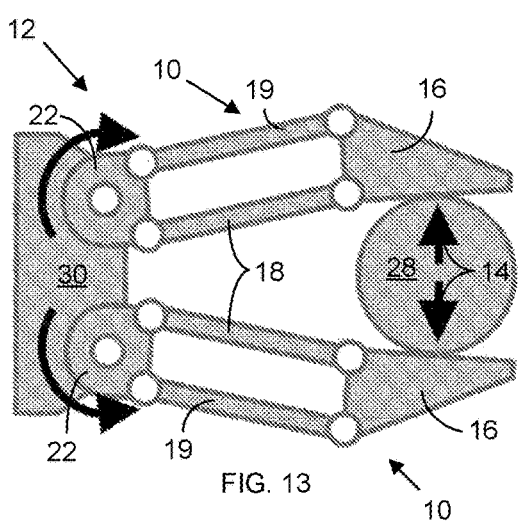
FIG. 13 illustrates the grasper 12 of FIG. 12 after the fingers 10 are rotated at their base links 22 to produce contact between the fingertip links 16 and object 28 that causes the fingertip links 16 to grasp the object 28 in a pinch grasp.

Innovative features in this grasper 12 are found in the fingers 10, shown schematically in FIG. 1, which make contact with the grasped object 28 and, therefore, exhibit the desired adaptive behaviors. In a particular embodiment, the fingers 10 are monolithic pieces of inexpensive cast elastomer (such as a urethane or a vulcanized rubber), as shown in FIG. 2, having a hole 15 in the center of the proximal side to form a linkage with flexure or living hinge joints 26. These fingers 10 are actuated at the base link 22 with at least one rotary joint 26; the fingers 10 can, for example, be actuated only in the plane, or they can be actuated in two directions via an actuated universal joint. In alternative embodiments, one or more of the links of the finger 10 can be formed of metal, providing added stiffness to reduce the potential for buckling.

The finger 10 has the following two distinct sets of possible motions, as illustrated in FIGS. 5-9: (a) active motions induced by actuators at the base link 22 and (b) passive motions induced by a contact force 14 on the front, rear or fingertip links 18, 19 or 16. The active motions cause the finger 10 to rotate and translate as a single rigid body, while the passive motions create internal compliant deformation. These two sets of motions can be used to grasp an object 28, as shown in FIGS. 10-13. As the finger 10 actively closes, contact is made with the object 28, and the fingers 10 deform passively. The combination of the two motions causes the grasper 12 to conform to the object's shape.

The deformation of the finger 10 disclosed herein is localized to specific zones, and the substantially varying thickness of the rubber causes the motion to behave more like a simple four bar linkage.

The links 22, 18, 19, and 16 are approximately parallel (as measured from the lines connecting the joints across the links), rather than meeting at the tip, as shown in the design of FIG. 14, which causes a very different passive deflection in the fingers 10. Rather than rotating as contact is made with the fingertip link 16 (as shown in FIG. 15), fingers 10 of the present design translate backward (dorsally) without rotating, as depicted in the images of FIGS. 16 and 17.

One advantage of this design is that the fingers 10 can be thrust over an object 28 without curling or buckling, as shown in FIGS. 18 and 19.

Figure 20:
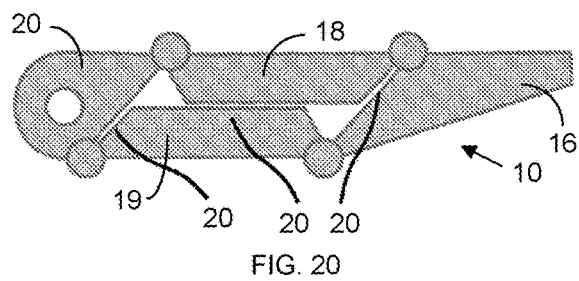
FIGS. 20 and 21 illustrate hard stops 20 provided by the shapes of the front and rear links 18 and 19 to limit the range of motion of the links where the hard stops 20 collide with other surfaces to thereby prevent over-extension of the finger 10 and reduce the passive compliance at the limits of travel.
Figure 21:
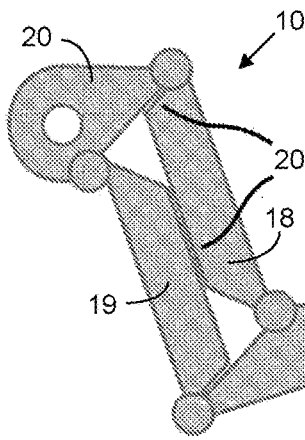
Figure 22:
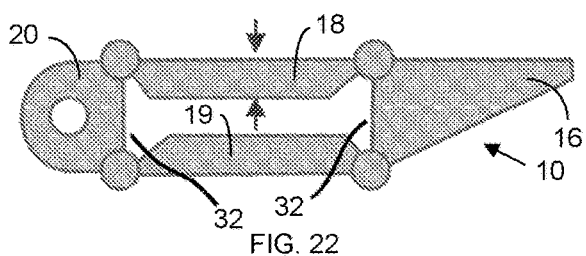
FIG. 22 illustrates a finger 10 where the shape of the links are altered from those in other embodiments to change the pivot locations at which the hard stops 20 are actuated; this embodiment features thinner front and rear links 18 and 19 and orthogonally oriented ends 32 of the base link 22 and fingertip link 16.
Figure 23:
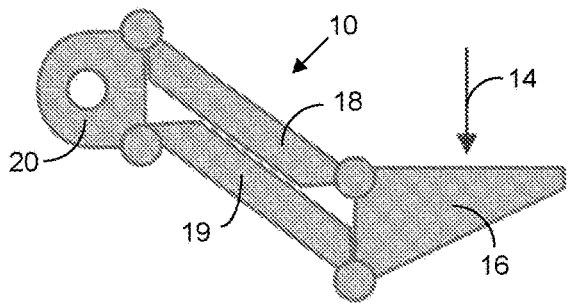
FIGS. 23 and 24 illustrate the range of motions of the finger 10 of FIG. 22 with downward and upward forces 14 acting on the fingertip link 16.
Figure 24:
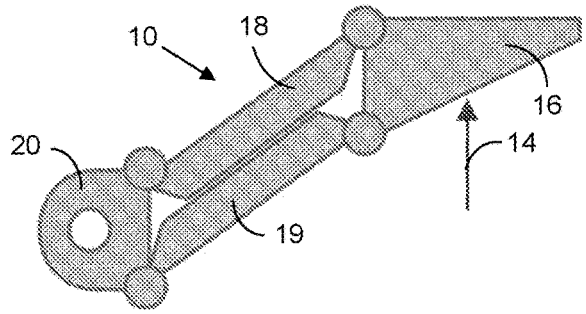

Limits to the passive motion of the finger 10 can be achieved by designing the shape of the hole 15 in the finger 10 to include contacting surfaces, which meet when the finger 10 is at the limits of its travel. FIGS. 20 and 21 show how the hard stops 20 in a particular embodiment work. By changing the shape of this hole 15, the limits of in-plane motion can be tuned, as seen in FIGS. 22-24, where the front and rear links 18 and 19 are thinner, and where the base link 22 and fingertip link 16 have orthogonal (vertical) end surfaces 32.

Figure 25:
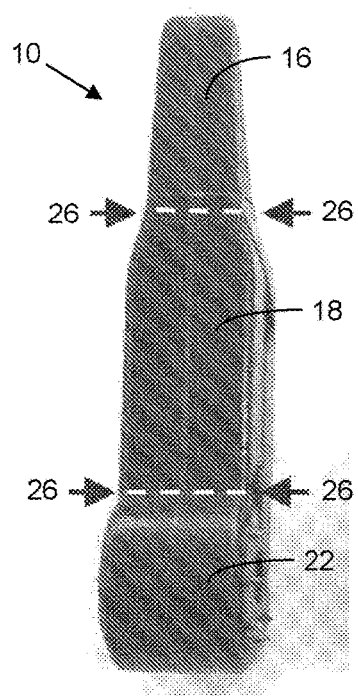
FIGS. 25-27 illustrate how the finger joints 26 allow out-of-plane compliance of the fingertip link 16, wherein the degree of compliance is a function of the width of the joints 26.
Figure 26:
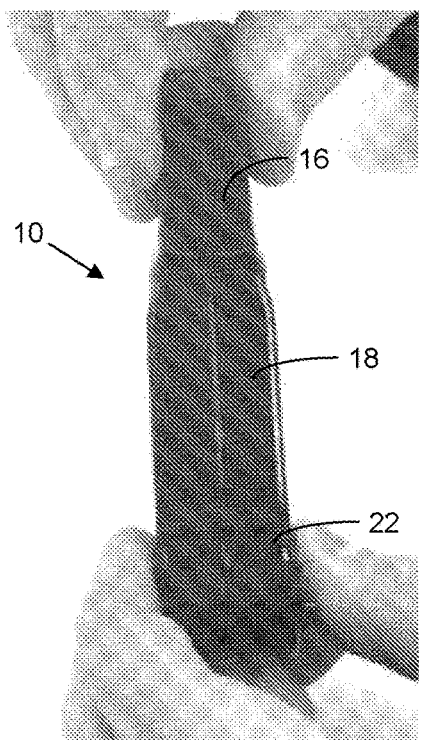
Figure 27:
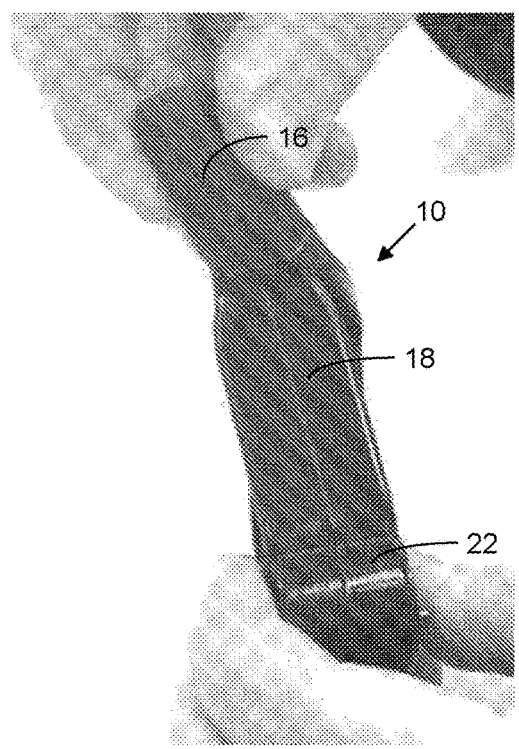
Figure 28:
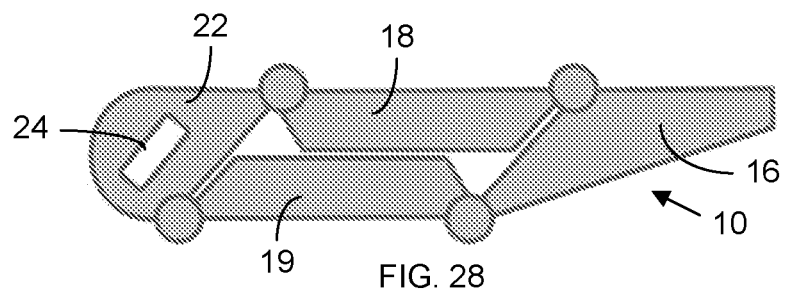
FIGS. 28-30 illustrate fingers 10 with rectangular-, hexagonal-, and spline-shaped orifices 24, respectively for mounting on shafts of complementary shapes.
Figure 29:
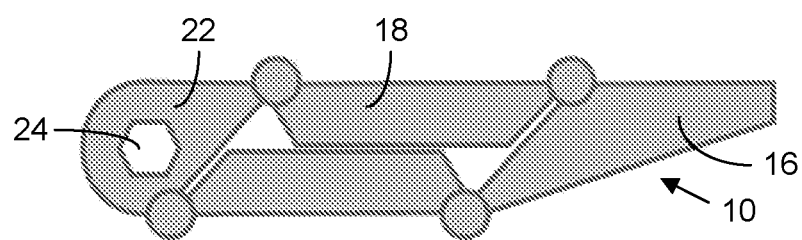
Figure 30:
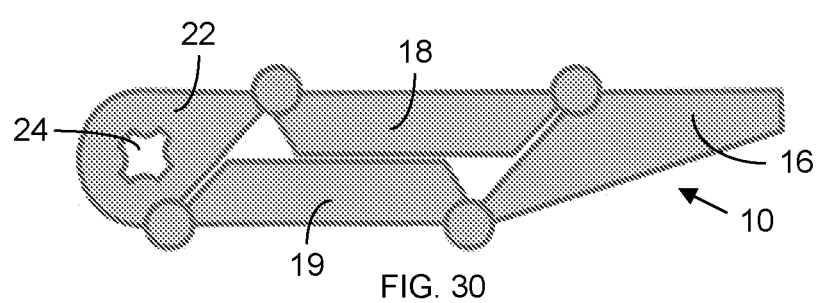
Figure 31:
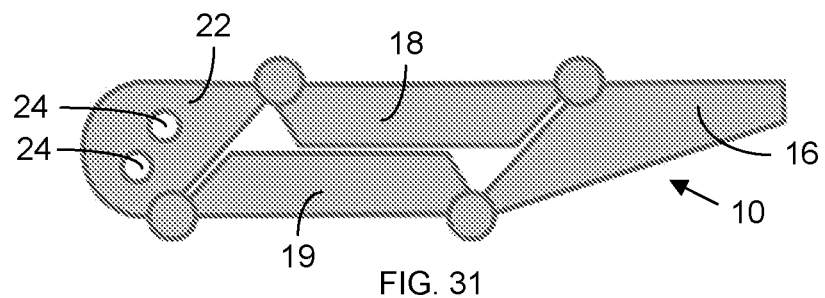
FIG. 31 illustrates a finger 10 with a base link 22 that defines multiple orifices 24 for mounting on a plurality of shafts.
Figure 32:
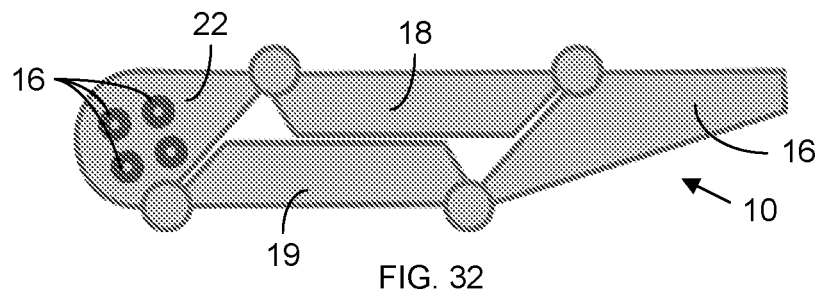
FIG. 32 illustrates a finger 10 with a base link 22 that includes a plurality of raised cleats 36 for mounting through respective orifices 38 in a mounting block 30.

Embodiments of this design feature relatively large out-of-plane compliance of the fingertip links 16, as illustrated in FIGS. 25-27. When the fingers 10 contact an object 28 or obstacle, the (approximate) joints 26 can twist to allow deflection of the fingertip links 16. This deflection can be tuned by varying the geometry of the flexure joints 26. In particular, the ratio of joint width to joint length (along the finger 10) affects how much the joint 26 can twist. The joints 26 in a unitary/monolithic linkage structure can have a thickness (measured in the plane of primary displacement that is no more than $\frac{1}{5}$th or no more than $\frac{1}{10}$th the thickness of the bulk of the front and rear links 18 and 19 (e.g., a thickness of about one or two mm for the joints 26 versus a bulk thickness of about one cm for the front and rear links 18 and 19) and, thereby, have a flexural modulus that is no more than $\frac{1}{5}$th the flexural modulus of the bulk of each of the front and rear links 18 and 19.

Additionally, contact surfaces of the fingertip links 16 can be formed of either a comparatively low-friction material or a comparatively high-friction material (e.g., having a frictional component lower or higher than that of other surfaces on the finger 10) depending on whether the user wishes for the fingers 10 to slip over or between objects 28 (low-friction) or to firmly grasp objects 28 (high-friction). In either case, the fingertip links 16 can be formed of a material and/or with a structure that makes the fingertip links 16 four times stiffer than the front and rear links 18 and 19.

Figure 33:
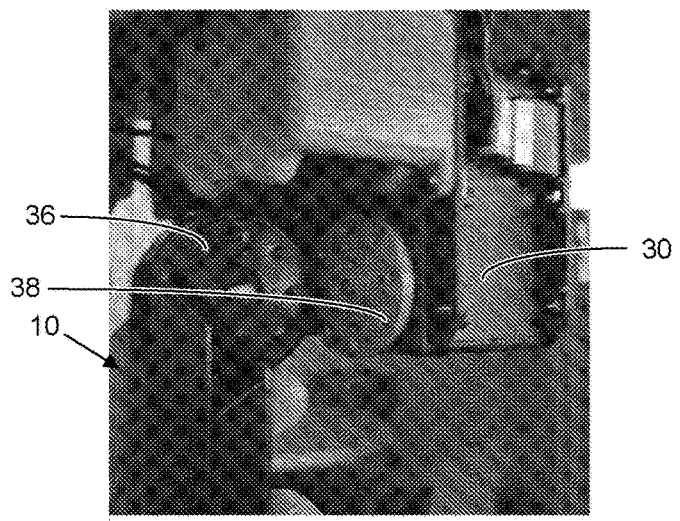
FIGS. 33-35 illustrate a finger with quick change cleats 36 being mounted in the complementary orifices 38 of a mounting block 30.
Figure 34:
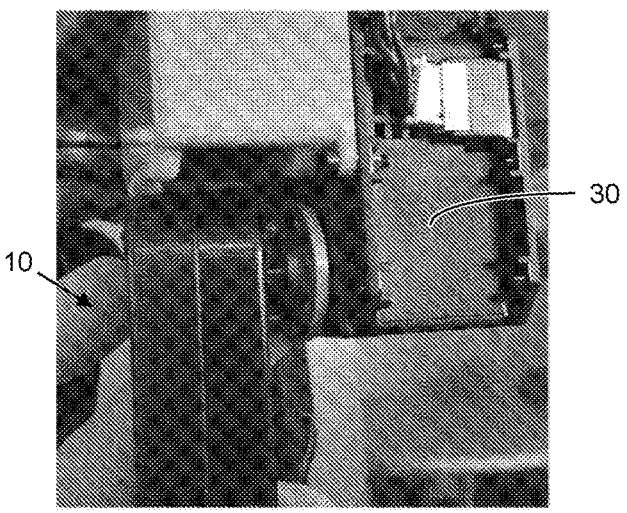
Figure 35:
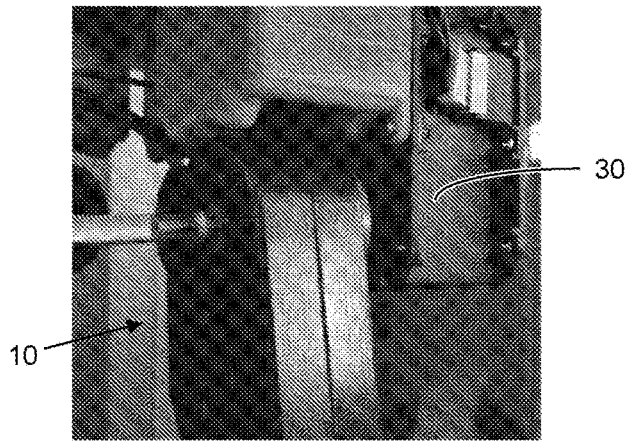

One advantage of this design is the ease with which the grasper fingers 10 can be quickly changed on the grasper 12 without any tools other than the operator's hands. FIGS. 28-32 show a variety of mating features that can be used to attach fingers 10 to the gripper's finger mounting block 30, including cleats 36 on the face of the finger 10, or non-round orifices 24 (e.g., in the shape of splines, rectangles, ovals, rounded rectangles, hex holes, etc.) in the finger base link 22. The quick-release mounting of a finger 10 on a mounting block 30 is shown in FIGS. 33-35.

Another feature in embodiments of the robot grasper 12, which will also be mentioned in methods of manufacture, is the use of multiple cast plastics having differing material properties. In the disclosed design, for example, a stiffer urethane can be used to form the links 16, 18, 19 and 22 and joints 26, and a more compliant urethane can be used for rubber grip pads on the fingertip links 16.

Alternative Embodiments:
Combining Translational and Rotational Actuation at the Base Link In particular embodiments, the fingers 10 are actuated with rotary motors (e.g., via a rotating shaft extending from the mounting block 30) only. However, pneumatic slides or linkages can also or alternatively be used, creating a combination of translational and rotary motion.

Non-Parallel Linkage Behaviors

Fingers 10 having a modular design can offer advantages; for example, many different four-bar linkage designs can be quickly changed onto the same gripper. The non-parallel design, shown in FIGS. 14 and 15, can also be realized as a monolithic part with living hinge joints 26.

Fiber Structural Elements

Strings, belts or cloth strips can be cast into the monolithic fingers 10, to form links that do not need to support compressive loads. For example, FIG. 41 shows a design where the front (palmar) proximal link is replaced by a belt. The fibrous material can also be cast into the rubber itself to change the stiffness of a joint 26 or to change the out-of-plane stiffness of a joint 26 by changing the fiber direction.

Thin Flexible Elements Made Out of Cast Material

As with the previous feature, elements that are not in tension during the typical use of a grasper 12 can be made out of thinner-cast elastomer so that the elements deform continuously, as shown in FIG. 42.

Rigid Inserts for Links in Compression

Some elements of the finger 10 are in compression during the typical use case (grasping with the fingertip links 16 or across the full length of the fingers 10). Any link can be stiffened through the use of in-molded inserts 44 made out of metal, plastic, printed circuit board, or similar materials, as illustrated in FIG. 40.

Rigid Links Connected to the Finger Via Pins

As an alternative to the previous feature, links made out of a separate material can be pinned into the structure using pin joints 26. The pinning of a separate material into the structure can be performed primarily to improve the compressive stiffness of a finger link, as shown in FIG. 43.

An Open Linkage

Rather than forming the linkage by creating a closed hole 15, the finger 10 can be molded as one piece having two "legs," each separately attached to some rigid mounting block 30, as shown in FIG. 38.

Sensors

As shown in FIG. 44, sensors 46, 48, or 52 for contact, contact pressure or deformation can be embedded in the cast finger body. For example, tactile sensors 46 can be cast into the rubber; and magnetic sensors 48 and magnets 50, or accelerometers 52 can be used to measure the finger shape and orientation.

Modifying Linkage Shape to Tune 3D Compliance

Modifying the linkage shape can be accomplished either by adding inserts to selectively stiffen joints 26 or by varying the width of the joints 26 in the finger 10. Wider joints will be more stiff in three dimensions, and narrower joints will be more compliant (see FIGS. 25-27).

Modifying Distal Finger Geometry to Alter Direction of Passive Motion Relative to the Fingertip Link A particular embodiment, shown in FIG. 20, places the palmar surface of the fingertip link 16 perpendicular to the direction of passive motion (initially parallel to the proximal links). This configuration can be altered to change the directional stiffness of the fingertip links 16, as shown in FIGS. 45 and 46.

Method of Manufacture

Figure 36:
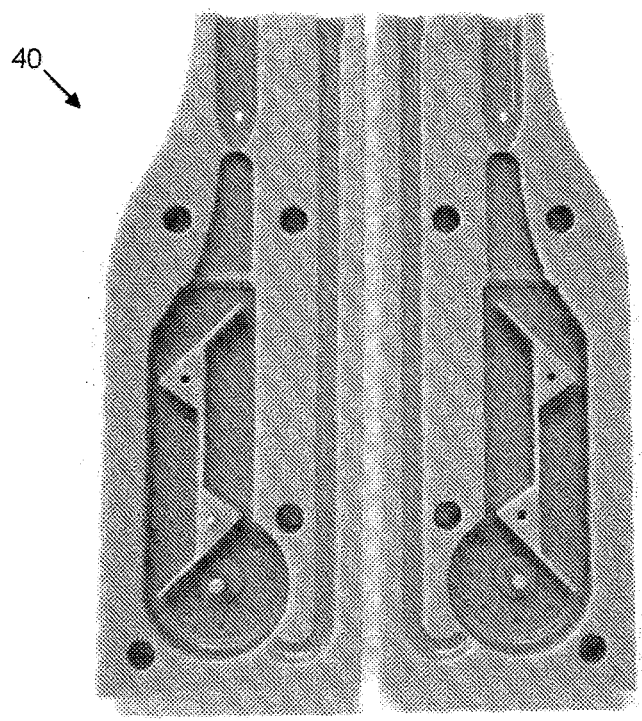
FIG. 36 illustrates a first mold 40 (unfolded in an open position) for casting a stiffer core of a finger.
Figure 37:
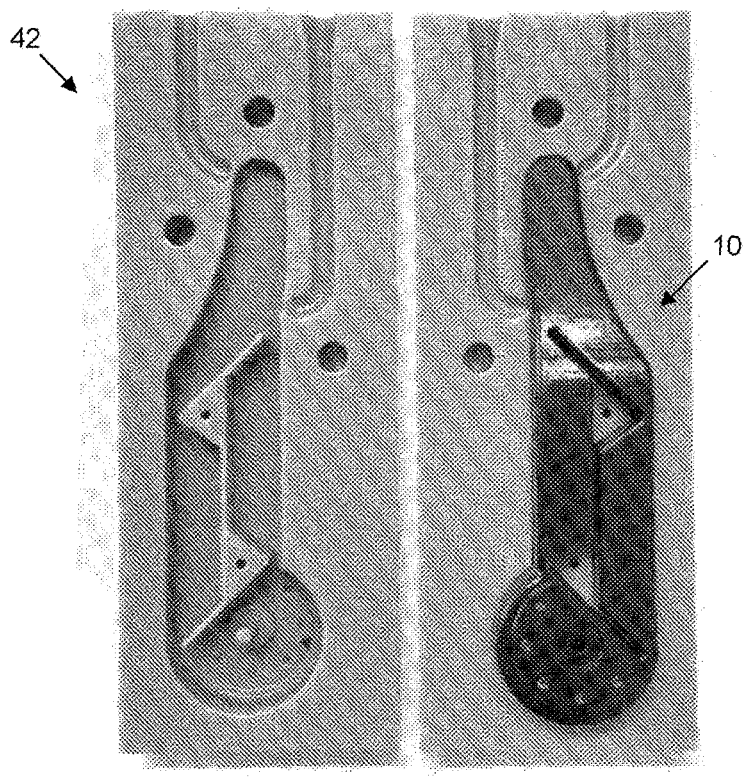
FIG. 37 illustrates a second mold 42, unfolded, for casting a soft rubber coating to provide a good gripping surface on the stiffer core produced from the first mold 40; a finger 10 cast in the molds 40 and 42 is shown in situ.

A method for manufacturing the fingers 10 is to cast the fingers 10 as a single unitary piece (rather than from separable components) from one or several elastomeric materials (e.g., from one or more thermoplastic elastomers). This casting can be done in a thermoplastic material or in a thermoset material, such as a urethane or a vulcanized rubber. FIGS. 36 and 37 show the molds for the fingers 10 in a particular embodiment, including a first mold 40 (FIG. 36) for the stiffer elastomer making up the finger body and a second mold 42 (FIG. 37) for the softer elastomer fingertip links 16. The part is cast in the first mold 40 and then transferred to the second mold 42 for overmolding. This method of manufacture can be used to construct graspers 12 having fingers 10 with the properties listed above, including the following:

an in-molded four-bar mechanism;
high out-of-plane compliance; and
an actuated base link 22 and completely internal passive motion.

Described, below, are a few methods of manufacture that can be used to produce these fingers 10 and graspers 12.

Casting Tactile and Shape/Orientation Sensors into the Monolithic Finger Body

In various embodiments of the grasper 12, magnets 50 for sensing the passive deformation of the finger 10 can be embedded in the finger 10. FIG. 44 shows a number of ways of doing this. For example, MEMS barometric pressure transducers can be embedded into cast elastomer parts for tactile sensing.

Casting in Multiple Stages to Incorporate Elastomers with Varying Properties

As mentioned before, there are a number of different material properties that can be incorporated into the design of these fingers 10, and these different properties can be provided by using multiple materials in a single monolithic finger 10. Examples of the incorporation of different materials to provide different properties include the following:

casting with a stiffer material in links that are intended to be more rigid;
casting flexure or living hinge joints 26 out of a material with low creep or high fatigue lift;
casting fingertip pads in abrasion-resistant material;
casting fingertip pads in high friction materials;
casting fingertip pads in soft materials; and
casting fingertip pads in food-safe materials.

Casting Inserts into the Fingers to Change the Stiffness of a Joint or Link

Examples of inserts 44 that can be cast into the fingers 10 to increase stiffness include using metal, plastic, printed circuit boards, fibers, woven cloth strips, or belts.

Casting Fasteners into the Monolithic Fingers for Mounting Features

Fasteners cast into the monolithic fingers 10 for mounting include bushings, bearings, brackets, or threaded inserts.

Alternative Manufacturing Techniques

In other embodiments, the linkage can be formed by other techniques, such as stamping or cutting the apparatus out of, e.g., sheet rubber. In still other embodiments, the linkage can be three-dimensionally (3D) printed.

Fabrication as Consumable Product

Due to the low cost of some of these fabrication techniques and the correspondingly low cost of the robot fingers 10, the fingers 10 can be frequently replaced after use in a grasper 12, particularly as the base link 22 of the fingers 10 can be designed with a simple orifice 24 or other connection structure for sliding the base link 22 of the finger 10 onto or into the actuator (e.g., rotary motor shaft) of the grasper 12.

Exemplary Applications

The fingers 10 and graspers 12 described herein can be used to acquire and move objects 28 as part of manufacturing and packaging processes, such as loading and unloading machines and putting parts on pallets and into shipping containers, or for order fulfillment (e.g., picking items from warehouse shelves or packing groceries for transport). In other embodiments, the graspers 12 can be used for food handling, wherein the outer surfaces of the fingers 10 are formed of a sterilizable, medical-grade elastomeric material for medical applications (e.g., for surgical applications or for treating patients with highly contagious diseases). Additionally, graspers 12 made with sterilizable fingers 10 made according to the above-described techniques can be used in clean room environments (e.g., for handling semiconductor wafers in semiconductor fabrication processes). Use of these graspers 12 can also reduce non-compliance or leakage (e.g., reducing handling errors, reducing the potential for failing to follow specified handling protocols and/or the potential for theft) compared with manual human handling of, e.g., pharmaceuticals, cologne or perfume, cosmetics, evidence in the context of legal proceedings, etc.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/5^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $40/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims. where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A compliant adaptive robot grasper, comprising:
a multi-bar finger linkage, including:
a) a fingertip link;
b) at least one base link at an opposite end of the linkage from the fingertip link, wherein the base link includes a mounting structure; and
c) a front link and a rear link joined with the fingertip link at a first set of respective passive joints and joined with the base link at a second set of respective passive joints, wherein linear connections between the passive joints form a shape substantially in the form of a parallelogram allowing the linear connections across the front and rear links to remain substantially parallel to one another as the front and rear links pivot about the base link without substantially changing the orientation of the fingertip link until and unless the multi-bar finger linkage contacts an external object, wherein the multi-bar finger linkage is configured such that contact with the external object will cause the orientation of the fingertip link relative to the front and rear links to change via passive pivoting of the front and rear links both about the first set of respective passive joints and about the second set of respective passive joints; and
an actuator coupled with the base link to rotate the multi-bar finger linkage about the base link.

2. The compliant adaptive robot grasper of claim 1, wherein the multi-bar finger linkage is a unitary structure, wherein the joints are provided by more-flexible thinned sections in the multi-bar finger linkage.

3. The compliant adaptive robot grasper of claim 2, further comprising at least one tactile sensor embedded in at least one of the links and configured to detect contact of a link with an external object.

4. The compliant adaptive robot grasper of claim 2, further comprising at least one inertial measurement device embedded in at least one of the links and configured to detect finger attitude and vibration.

5. The compliant adaptive robot grasper of claim 2, further comprising at least one magnet and at least one magnetometer, wherein at least one of the magnet and magnetometer is embedded in at least one of the links.

6. The compliant adaptive robot grasper of claim 1, wherein the multi-bar finger linkage is formed of at least one elastomeric material.

7. The compliant adaptive robot grasper of claim 6, wherein the multi-bar finger linkage comprises a plurality of materials, and wherein the fingertip link includes a surface that has a lower or higher frictional coefficient than other surfaces of the multi-bar finger linkage.

8. The compliant adaptive robot grasper of claim 1, wherein the grasper includes a plurality of the multi-bar finger linkages mounted and respective rotary actuators for each multi-bar finger linkage.

9. The compliant adaptive robot grasper of claim 8, further comprising a robotic arm to which each rotary actuator is mounted.

10. The compliant adaptive robot grasper of claim 1, wherein the actuator coupled with the base link is the only actuator coupled with any of the links.

11. The compliant adaptive robot grasper of claim 1, wherein the front and rear links directly join the fingertip link with the base link without additional joints beyond the four specified.

12. A compliant adaptive robot grasper, comprising:
a multi-bar finger linkage, including:
a) a fingertip link;
b) at least one base link at an opposite end of the linkage from the fingertip link, wherein the base link includes a mounting structure; and
c) a front link and a rear link joined with the fingertip link at a first set of respective joints and joined with the base link at a second set of respective joints, wherein linear connections between the joints form a shape substantially in the form of a parallelogram allowing the linear connections across the front and rear links to remain substantially parallel to one another as the front and rear links pivot about the base link without substantially changing the orientation of the fingertip link until and unless the multi-bar finger linkage contacts an external object, wherein
the multi-bar finger linkage is a unitary structure, wherein the joints are provided by more-flexible thinned sections in the multi-bar finger linkage, and wherein at least one of the links includes a cut-out that provides a hard stop, limiting the extent to which the front link and the rear link can pivot; and
an actuator coupled with the base link to rotate the multi-bar finger linkage about the base link.

13. A multi-bar finger linkage for a compliant adaptive robot grasper, including:
a fingertip link;
at least one base link at an opposite end of the linkage from the fingertip link, wherein the base link includes a mounting structure; and
a front link and a rear link joined with the fingertip link at a first set of respective passive joints and joined with the base link at a second set of respective passive joints, wherein linear connections between the passive joints form a shape substantially in the form of a parallelogram, allowing linear connections across the front and rear links to remain substantially parallel to one another as the front and rear links pivot about the base link without substantially changing the orientation of the fingertip link until and unless the finger linkage contacts an external object, wherein the multi-bar finger linkage is configured such that contact with the external object will cause the orientation of the fingertip link relative to the front and rear links to change via passive pivoting of the front and rear links both about the first set of respective passive joints and about the second set of respective passive joints.

14. The multi-bar finger linkage of claim 13, wherein at least a core of each link is joined with at least a core of each of the other links in a unitary structure formed of a cast first elastomer.

15. The multi-bar finger linkage of claim 14, wherein the cast elastomer core of at least the fingertip link is coated with a second elastomer coating, wherein the second elastomer has a higher or lower coefficient of friction than the first elastomer.

16. A method for robotic grasping, comprising:
inwardly rotating a plurality of multi-bar finger linkages, wherein each multi-bar finger linkage includes a fingertip link; at least one base link at an opposite end of the linkage from the fingertip link and including a mounting structure; and a front link and a rear link joined with the fingertip link at a first set of respective passive joints and joined with the base link at a second set of respective passive joints, wherein linear connections between the joints form a shape that substantially takes the form of a parallelogram, and wherein the linear connections across the front and rear links remain substantially parallel to one another as the front and rear links pivot from the base link due to the inward rotation without substantially changing the orientation of the fingertip link until the multi-bar finger linkage contacts an external object; and
contacting an external object between the multi-bar finger linkages, at which point, the contact with the external object causes the orientation of the fingertip links to change relative to the front and rear links via passive pivoting of the front and rear links both about the first set of respective passive joints and about the second set of respective passive joints.

17. The method of claim 16, wherein the external object is contacted by the front link of each linkage, and wherein the fingertip links inwardly pivot relative to the front and rear links and along the object after that contact.

18. The method of claim 16, wherein the external object is contacted by the fingertip link of each linkage, and wherein the orientation of the fingertip links relative to the object and to each other remains fixed once the fingertip links contact the object.

19. The method of claim 18, wherein contact surfaces of the fingertip links remain parallel to one another after the fingertip links contact the object and as the base link continues to pivot.

20. The method of claim 16, wherein the fingertip links pivot passively independently of active pivoting of the base link.

21. The method of claim 16, further comprising replacing the multi-bar finger linkages after use without the use of a tool beyond human hands.

22. The method of claim 16, further comprising spearing the multi-bar linkages toward the object, wherein at least one of the fingertip links elastically deflects out-of-plane along the object when contact is made between the fingertip link and the object.

23. The method of claim 22, wherein the deflection of the fingertip link is a consequence of twisting at the joints.

24. The method of claim 16, wherein rotation of the multi-bar finger linkages is actively driven exclusively by an actuator coupled with the base link, while the fingertip links pivot passively independently of the active actuation provided by the actuator at the base link.

* * * * *